United States Patent
Perrot et al.

(10) Patent No.: US 8,004,987 B2
(45) Date of Patent: Aug. 23, 2011

(54) METHOD TO PRIORITIZE VIDEOS DISTRIBUTED IN A WIRELESS LAN AND DEVICE IMPLEMENTING THE METHOD

(75) Inventors: Sébastien Perrot, Issy les Moulineaux (FR); Gilles Straub, Acigne (FR)

(73) Assignee: Thomson Licensing, Boulogne-Billancourt (FR)

( * ) Notice: Subject to any disclaimer, the term of this patent is extended or adjusted under 35 U.S.C. 154(b) by 221 days.

(21) Appl. No.: 11/886,784

(22) PCT Filed: Mar. 8, 2006

(86) PCT No.: PCT/EP2006/060547
§ 371 (c)(1),
(2), (4) Date: Sep. 20, 2007

(87) PCT Pub. No.: WO2006/103151
PCT Pub. Date: Oct. 5, 2006

(65) Prior Publication Data
US 2009/0067326 A1    Mar. 12, 2009

(30) Foreign Application Priority Data

Mar. 31, 2005 (EP) .................................. 05290713
Sep. 13, 2005 (EP) .................................. 05108383

(51) Int. Cl.
*H04L 12/26* (2006.01)
*H04J 3/16* (2006.01)
(52) U.S. Cl. ........................................ 370/235; 370/465
(58) Field of Classification Search .................... None
See application file for complete search history.

(56) References Cited

U.S. PATENT DOCUMENTS

| | | | | |
|---|---|---|---|---|
| 6,236,643 B1* | 5/2001 | Kerstein | ........................ | 370/254 |
| 6,862,279 B1* | 3/2005 | Imai et al. | ..................... | 370/390 |
| 7,180,855 B1* | 2/2007 | Lin | ................ | 370/230 |
| 2002/0145974 A1* | 10/2002 | Saidi et al. | ..................... | 370/230 |
| 2002/0152321 A1* | 10/2002 | Le et al. | ........................ | 709/238 |
| 2002/0181394 A1* | 12/2002 | Partain et al. | ................. | 370/229 |
| 2003/0231594 A1 | 12/2003 | Xu et al. | | |
| 2004/0010615 A1* | 1/2004 | Ernst et al. | .................... | 709/238 |
| 2004/0213152 A1* | 10/2004 | Matuoka et al. | ............. | 370/230 |
| 2004/0228281 A1* | 11/2004 | Rakotoarivelo et al. | ...... | 370/252 |
| 2004/0266427 A1* | 12/2004 | Kurokawa | .................. | 455/426.2 |
| 2005/0138451 A1* | 6/2005 | Simpson et al. | ............. | 713/320 |
| 2005/0249114 A1* | 11/2005 | Mangin et al. | ................ | 370/229 |

OTHER PUBLICATIONS

Jaeyeon Lee; Jongwon Kim: "Differentiation mechanisms over IEEE 802.11 wireless LAN for network-adaptive video transmission", Lecture Notes in Comput. Sci. Int'l Conference, Information Networking. Networking Technologies for Broadband and Mobile Networks. ICOIN 2004 (Revised Selected Papers—Feb. 18-20, 2004—Busan. South Korea) vol. 3090, 2004, pp. 553-562. Chung-Sheng Li; Tak-Goa Tsuei; Han-Chieh Chao: "Evaluation of contention-based EDCA for IEEE 802.11e wireless LAN", Journal of Internet Technology, vol. 5, No. 4, 2004, pp. 429-434.
Search Report Dated Jun. 1, 2006.

* cited by examiner

*Primary Examiner* — Kevin C Harper
(74) *Attorney, Agent, or Firm* — Robert D. Shedd; Jeffrey M. Navon

(57) ABSTRACT

The invention concerns method to distinguish between streams received by an access point from a distribution network and transmitted to stations and a way to give better priority to some of them towards others. In a system where streams are transmitted with a level of priority corresponding to there type, it adds a selection criterion to determine priority between streams of the same type. The invention also concerns an access point implementing the method.

16 Claims, 5 Drawing Sheets

| Priority | 802.1D Priority (= UP) | 802.1D Designation | Access Category | WME Designation |
|---|---|---|---|---|
| lowest | 1 | BK | AC_BK | Background |
| ↓ | 2 | - | | |
| | 0 | BE | AC_BE | Best Effort |
| | 3 | EE | | |
| | 4 | CL | AC_VI | Video |
| ↓ | 5 | VI | | |
| highest | 6 | VO | AC_VO | Voice |
| | 7 | NC | | |

| AC | $CW_{min}$ | $CW_{max}$ | AIFSN | TXOP Limit (802.11b) | TXOP Limit (802.11a/g) |
|---|---|---|---|---|---|
| AC_BK | 15 | 1023 | 7 | 0 | 0 |
| AC_BE | 15 | 63 | 3 | 0 | 0 |
| AC_VI | 7 | 15 | 1 | 6.016ms | 3.008ms |
| AC_VO | 3 | 7 | 1 | 3.264ms | 1.504ms |

Fig. 3

| Priority | 802.1D Priority (= UP) | Designation | Access Category | WME Designation |
|---|---|---|---|---|
| lowest | 1 | BK | AC_BK | Background |
| | 2 | - | | |
| | 0 | BE | | |
| | 3 | EE | | |
| | 4 | CL | | |
| | 5 | VI_l | AC_BE | Best Effort |
| | 5 | VI_h | AC_VI | Video |
| highest | 6 | VO | AC_VO | Voice |
| | 7 | NC | | |

Fig. 4

| AC | CW$_{min}$ | CW$_{max}$ | AIFSN | TXOP Limit (802.11b) | TXOP Limit (802.11a/g) |
|---|---|---|---|---|---|
| AC_BK | 15 | 1023 | 7 | 0 | 0 |
| AC_VI_l | 7 | 15 | 2 | 0 | 0 |
| AC_VI_h | 7 | 15 | 1 | 6.016ms | 3.008ms |
| AC_VO | 3 | 7 | 1 | 3.264ms | 1.504ms |

METHOD TO PRIORITIZE VIDEOS DISTRIBUTED IN A WIRELESS LAN AND DEVICE IMPLEMENTING THE METHOD

This application claims the benefit, under 35 U.S.C. §365 of International Application PCT/EP2006/060547, filed Mar. 8, 2006, which was published in accordance with PCT Article 21(2) on Oct. 5, 2006 in English and which claims the benefit of European patent applications No. 05290713.6, filed Mar. 31, 2005 and 05108383.0 filed Sep. 13, 2005.

The invention takes place in the context of wireless network and their use in the domestic context. In particular it addresses the quality of service issue when using the wireless network to distribute streamed media.

As the high bandwidth networks are developing, their use to distribute some streamed media like video or audio is growing. In parallel, wireless equipment to build home network is also spreading around. Then the problem of distributing media like video in the home using wireless communication as the last medium in the home is becoming a crucial issue.

One of the most popular standard to implement wireless communication in the context of home networking today is the IEEE (Institute of Electrical and Electronics Engineers) 802.11 family of protocols generally known as "Wi-Fi".

In the 802.11 family of protocols, 802.11e is aimed at improving the quality of service of the communication. To achieve this, it defines 4 categories of traffic as a function of the type of service. A specific set of parameters used in the access to the medium is attributed to each of these 4 categories, thus defining some priorities. The first category is dedicated to voice and is attributed a set of parameters that gives to traffic of these category the best access to the communication medium. The second category is dedicated to video. The third one is called best effort and is dedicated to other type of services while the forth is called background and will receive traffic that does not fit in another category like control messages.

One can see that traffic will get a priority on the medium access according to its type and that all traffic of the same type will get the same priority.

When distributing some media to the home from a distribution network, a Wi-Fi access point is generally connected to the distribution network by a high bandwidth connection like ADSL (Asymmetric Digital Subscriber Line) or cable or any kind of connection. The data are arriving to the access point, acting as a gateway between the wireless home network and the outside network, and is distributed within the home by the Wi-Fi network to the final client generally called station. In this context, all videos distributed to the home will arrive to the access point and being sent to clients within the home using the wireless network. They will share the same radio medium with the same priority.

The distribution can also be done within the wireless network from a media server to the station, or from a local wired network. Whatever source is producing the media, a distribution from the access point to station is done.

When facing a degradation of the wireless medium or an increase of the traffic on the wireless network, both conditions leading to a reduction of the bandwidth usable by the video traffic, there will be a moment where this bandwidth won't be able to allow a transport of all videos in good conditions. In this case, we will face a degradation of all the distributed videos. It could be considered advantageous to privileged some of the videos seen as more important and to allow them to be distributed in good condition as long as possible at the price of the degradation of other ones.

The invention resides part in recognizing the above problem and part in proposing the solution as defined in the claims.

The invention concerns method to distinguish between streams received by an access point from a source and transmitted to stations and a way to give better priority to some of them towards others. In a system where streams are transmitted with a level of priority corresponding to their type, it adds a selection criterion to determine priority between streams of the same type. The invention also concerns an access point implementing the method.

In a particular embodiment the invention concerns a method to transmit streams in a network, at the level of a transmitting device, wherein a stream has a stream type and a stream type is associated with a predetermined priority level, comprising at least the following steps:
  determination of a selection criterion for a stream to be transmitted;
  determination of a priority level for transmission of said stream, among the priority level associated with the type of the stream to be transmitted and another priority level, as a function of the selection criterion.

In a particular embodiment the transmitting device is a home gateway between a source and transmits data to at least one station on the local area network.

In a particular embodiment the selection criteria comprises a step of verifying the level of traffic already transmitted with the other level of priority.

In a particular embodiment the selection criterion comprises the first received transmitted stream for a certain type and where this first received transmitted stream is transmitted using the level of priority corresponding to the type of the transmitted stream while subsequent received stream of the same type are transmitted using a lower level of priority.

In a particular embodiment the selection criterion comprises the origin of the transmitted stream.

In a particular embodiment the selection criterion comprises the destination of the transmitted stream.

In a particular embodiment several virtual networks are used on the wireless network and wherein the selection criterion comprises the virtual network used to transmit the stream.

In a particular embodiment the invention also concerns a transmitting device between a source and at least one station connected to the transmitting device, the transmitting device having reception means receiving streams of data from the source, transmitting means to transmit received streams to at least one station connected to the transmitting device, wherein a stream has a stream type and a stream type is associated with a predetermined priority level and further comprising determination means of a selection criterion for a streams to be transmitted and where the transmitting means are adapted to determine a priority level for transmission of said stream, among the priority level associated with the type of the stream to be transmitted and another priority level, as a function of the selection criterion.

In a particular embodiment, a tag in the stream being associated with each level of priority, the determination of a priority level is done by changing the tag in the stream.

In a particular embodiment the type of the transmitted stream is video.

More advantages of the invention will appear through the description of particular, non-restricting embodiments of the invention. The embodiment will be described with reference to the following figures:

FIG. 3 is a table of the default EDCA Parameters for the access point.

FIG. 4 is a table representing a modified 802.1D priority mapping to 802.11e categories.

The embodiment of the invention takes place in the domain of wireless network. These networks are generally implemented with at least one access point and stations connected to the access point. In this context, the distribution of streamed real time media, like video, has always a last step where the media is distributed from the access point to some of the stations. The source of media could be servers on a distribution network; in this case the access point will generally be connected to the distribution network and act as a gateway between the distribution network and the wireless network. The gateway connecting the wireless network could also be another device on the wireless network, in this case the traffic will come from the distribution network and will be transmitted by the gateway to the access point, and then the access point will transmit it to the stations. The source could be also a server on a wired local network connected to the wireless network. In this case the wired local network acts as the distribution network. It could also happen that the source is a server directly connected to the wireless network. Then the traffic is distributed from the server to some of the station via the access point.

By default, all video traffic is sent on the air through the AC_VI access category. When there is enough bandwidth available, several videos can be sent at the same time. When the bandwidth decreases, due for example to radio perturbations or to increase in the data being using the network, as all video share the same priority for the medium access they will all be affected evenly by the reduction of available bandwidth or congestion. When there is not enough bandwidth, the video queue will overflow and video packets will be lost. The consequence is that all videos will be degraded, since both will experience packet loss. As there is no mechanism to differentiate between video in 802.11e standard, all video will be degraded.

IEEE 802.11e is a draft standard for enhanced quality of services in the MAC (Medium Access Control). It includes an additional coordination function called the Hybrid Coordination Function. The HCF uses a contention based access method called the Enhanced Distributed Channel Access (EDCA) and a controlled channel access called the HCF Controlled Channel Access (HCCA).

Figure 1:
FIG. 1 is a table representing the mapping of the 802.1D priorities to the 802.11e ones.

EDCA provides differentiated and distributed access to the wireless medium with 4 access categories that provide support for the delivery of traffic with 8 different user priorities. The protocol 802.1D defines an architecture and protocol for the interconnection of IEEE 802 LANs below the MAC Service boundary. This standard is defining 8 user priorities. These priorities are used to define the access category attributed to a packet. A mapping of these 802.1D user priorities to 802.11e access categories is indicated in the table of FIG. 1.

The embodiment concerns a method to add some mechanism that will allow a differentiation between videos. Assuming such mechanism is there, the invention proposes a method to send different videos at different priorities for downlink traffic.

It uses the EDCA mechanism. The mapping between user priorities and access categories is modified. In such a way, if some congestion occurs for the video stream, the packet loss will apply to only one video stream or some of them. The consequence is that the privileged videos will be preserved.

Figure 2:
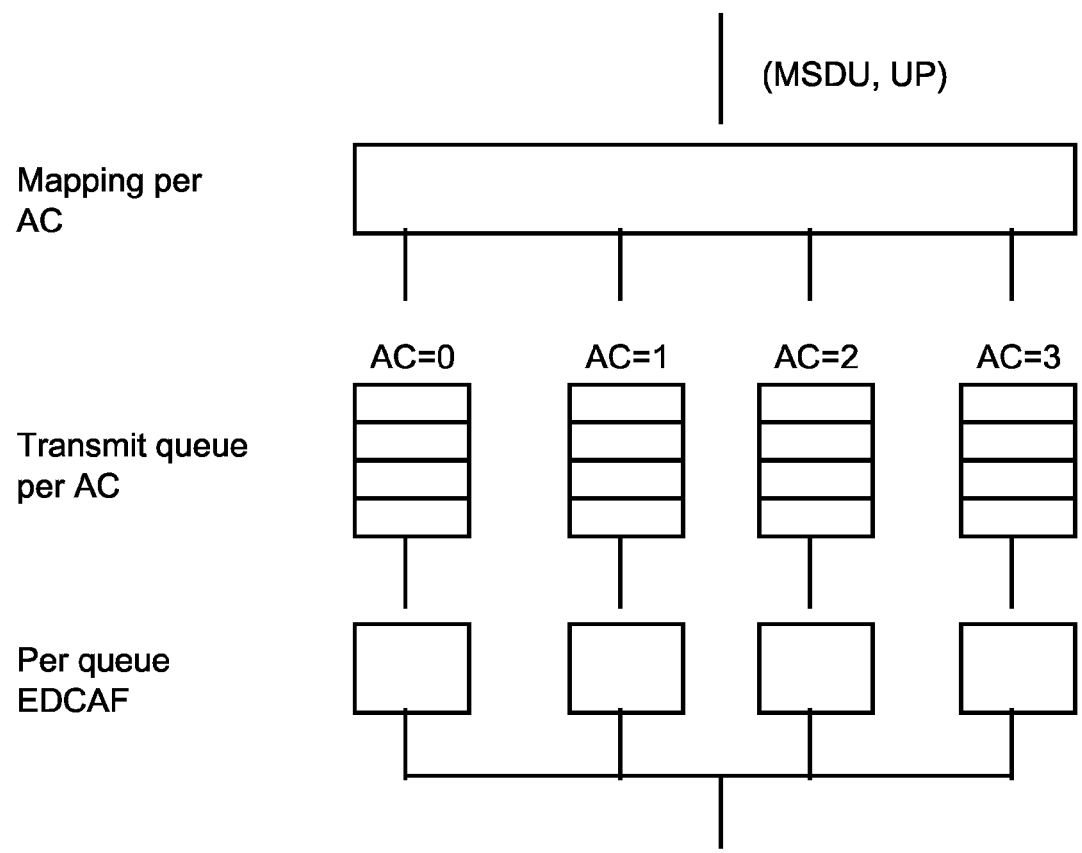
FIG. 2 is a scheme of EDCA mechanism.

FIG. 2 describes EDCA mechanism as it is conceptually implemented in the MAC. EDCA defines 4 access categories. Each access category is allocated a set of parameters to access the medium. The access point sends the EDCA parameters to be used by the stations in some management frame. When this has not been indicated by the access point, the station shall use the default parameters. Then FIG. 2 shows the traffic arriving as MSDU packets that will be dispatched according to the 802.1D user priority in the 4 access categories represented, AC=0, AC=1, AC=2 and AC=3. Each of these queues will access the medium with its respective set of access parameters.

The standard allows the access point to use a different set of EDCA parameters than the one sent to the stations in its BSS. And it can thus have access to the medium with higher priorities.

The table of FIG. 3 indicates the set of default parameters for the access point, as determined by the WMM test plan.

In a first embodiment of the invention the mapping between 802.1D user priority and the 802.11e access categories is modified.

Priority mapping between 802.1D and Access Category is different from what is defined in 802.11e.

Video traffic is split into 2 types: high priority video, VI_h and low priority video, VI_l.

Mapping to access category is indicated in table of FIG. 4. The former user priority 5, called VI and dedicated to video traffic in 802.1D is now constituted of the two user priorities VI_h for high priority videos and VI_l for low priority video. VI_h traffic will be mapped to the access category video as before while the VI_l traffic will be down categorized in the Best Effort access category. By doing this, VI_h will access the medium with a higher priority than the VI_l traffic. When the network is facing some congestions or perturbation, the VI_l will be degraded before the VI_h traffic allowing the videos considered as more important to keep a good quality longer than the other ones.

Figures 5, 6:
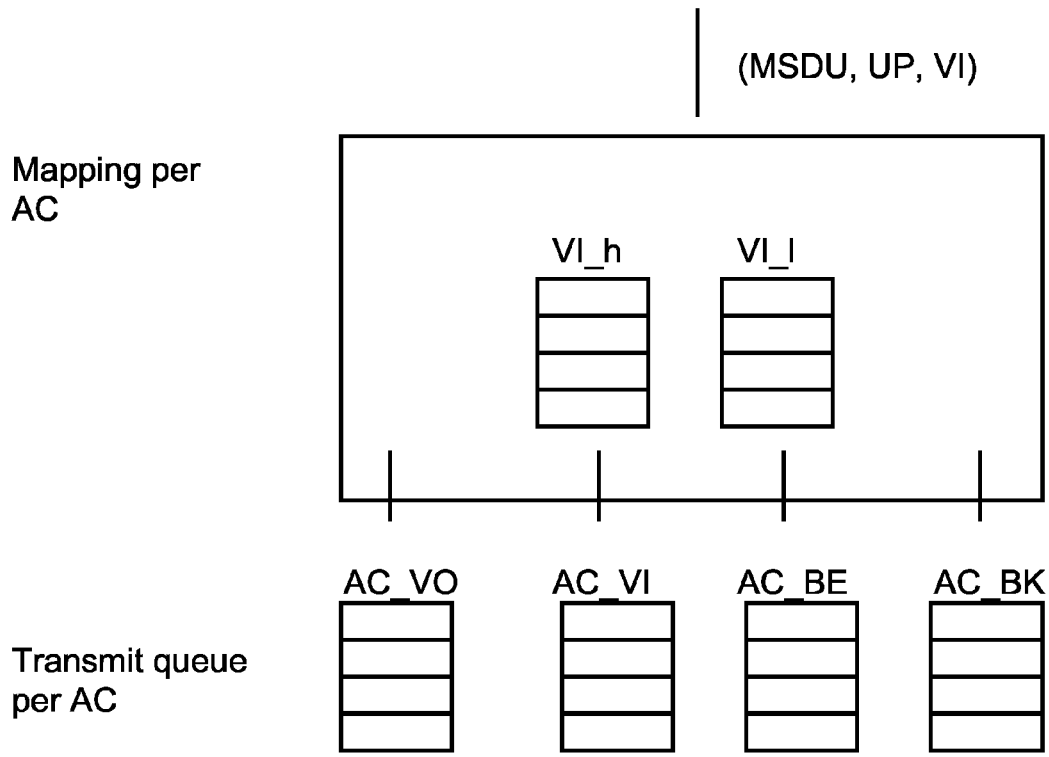
FIG. 5 is a scheme of the mapping of video traffic in one embodiment of the invention.
FIG. 6 is an example of EDCA parameters that could be used for the 4 categories of the access point in one embodiment of the invention.

The access point sends the high priority video traffic VI-h through the AC-Vi access category and the low priority video traffic VI-l through the AC_BE access category, as indicated in FIG. 5.

To improve the distribution of some of the videos in the Best Effort category when not facing congestion or degradation of the network it could be of use to modify the EDCA set of parameters attributed to each category at the level of the access point.

The parameters used for each access categories are set to values to enable distribution of video in AC_BE as well.

One possible EDCA parameter set to be used by the access point can be the one illustrated in the table of FIG. 6. The parameter CWmin corresponds to the initial value of the contention window (CW). CWmax is the maximal value that can be reached by the CW. The AIFSN ("arbitration inter frame space number") subfield indicates the number of slots after a SIFS duration a non-AP QSTA should defer before either invoking a backoff or starting a transmission. TXOP is the transmission opportunity, which is an interval of time when a particular STA has the right to initiate frame exchange sequences onto the wireless medium. TXOP limit is the time limit on TXOP that is granted.

Using the same $CW_{min}$ and $CW_{max}$ for both videos allows that the competition with the data will be equivalent for both videos. Increasing the AIFSN by one for the video low will ensure a strict priority algorithm between both queues: this will ensure that the high priority video will always get access to the medium before the low priority video.

Figure 7:
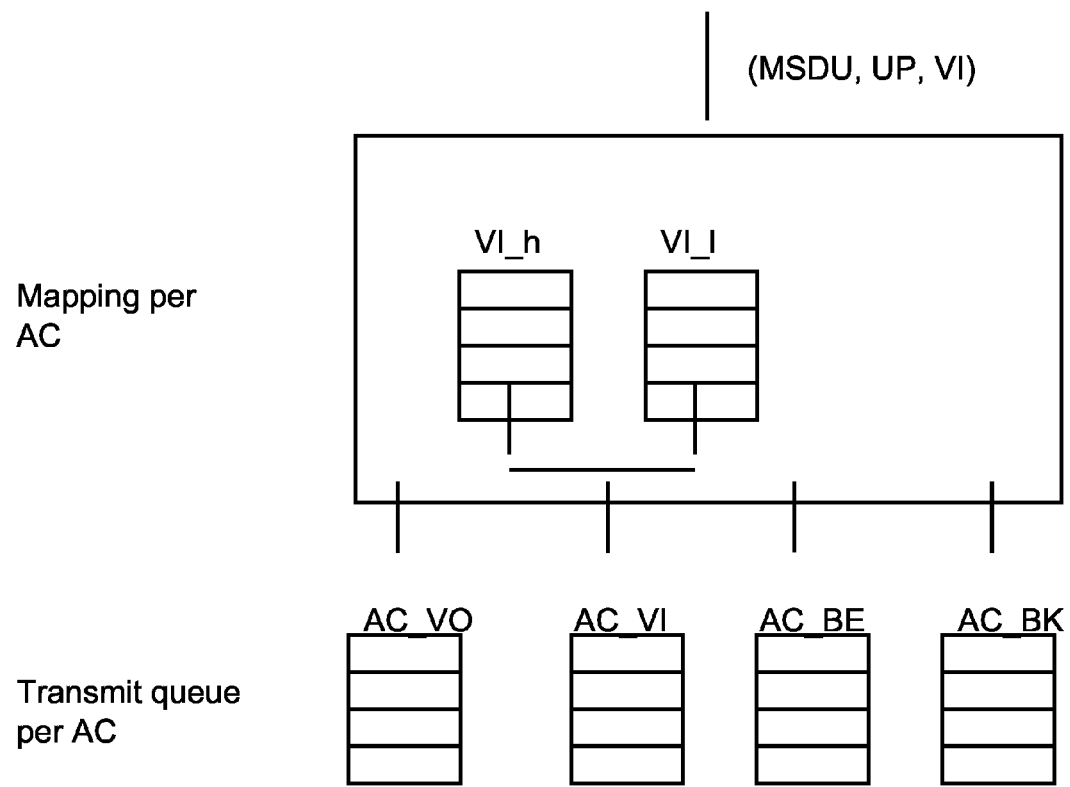
FIG. 7 illustrates a prioritization according to a particular embodiment of the invention.

In a second embodiment of the invention, all the video traffic, VI_h and VI_l is sent using the video access priority. In this case the prioritization between videos is not done by different medium access parameters. Instead, 2 new queues are created upstream of the access categories queues. The first one will be dedicated to the VI_h videos and the second one to the VI_l videos. The prioritization will be done by the method to empty these queues to feed the access categories queues. This is illustrated FIG. 7.

In this case the video access category only is used to send video traffic.

Different video traffics are prioritized prior to be sent to the transmit queue. Video differentiation requires the implementation of two internal queues between the output of the 802.1D switch and the AC queue. These queues have a finite and equivalent queue. Some queuing algorithm is then to be used between both queues. Several possibilities are possible:

Strict priority (VI_h queue shall be empty to read the VI_l queue
  Weighted round robin: this allows setting a weight to the VI_h queue being higher than the VI_l. This algorithm schedules in terms of packets.
  Weighted fair queuing does not seem to be appropriate since WFQ shares a throughput in terms of bit per seconds. However in the 802.11 case the throughput may not be constant and the model does not apply.
  Queuing algorithm is also to be coupled with the AC queue reading process: reading of Video queues shall be done only if the AC queue is not empty.

As the 802.1D tags are used to determine the type of the stream to be transmitted there is another way of changing the priority of stream. In a third embodiment the level of priority is affected by changing the 802.1D tag of the stream. Once the tag is changed the access category is attributed in a standard way according to this new tag changing the effective level of priority of the stream in comparison of the one which would have been attributed according to the former tag.

There are many ways to choose which stream should be privileged. A first possibility could be to privilege the first stream transmitted towards the following. The first received stream will receive the VI_h user priority while subsequent received stream will receive the VI_l one until the end of the transmission of the first one. When the transmission of the first one finishes, it is possible to change the priority of one of the subsequent stream from VI_l to VI_h or to wait until the reception of a new stream that will receive the VI_h priority. Instead of choosing only to attribute the VI_h to one stream it is also possible to determine a number "N" of stream to be transmitted using the VI_h priority. This way then N first received stream would receive the VI_h priority while the subsequent ones will receive the VI_l.

Another possibility is to privilege streams according to their origin. This allows privileging some services towards others. For example a movie bought on a video on demand service will be privileged towards access to free TV channel. As each service is likely to be serviced by different operator, each hosting some servers in different domain, a configuration of the user priority to be attributed from the originating domain of the stream is possible. In this case the attribution of the VI_h or VI_l user priority will be done according to the source of the stream. The choice of which originating domain to privilege could be done by the user in a configuration menu of the access point.

Another possibility is to allow the user to choose to privilege stream according to the destination. It is possible to give higher privilege to the videos which destination is the high end reception device of the living room toward the small screen of the kitchen or the children devices, or to privilege streams to be recorded on a PVR towards live streams. In this case the access point will select the appropriate priority according to the destination address of the received stream.

The choice of the destination device to privilege could be done by the user in a configuration menu of the access point.

It is still possible to attribute the priority from the kind of received stream. The user will likely be able to subscribe to different services, each one having its level of quality or business model. Some of them will be high quality, high bandwidth services when others will be of lesser quality. This will lead to different compression rate, different resolution stream. The user will tolerate less degradation on the high end services he will have subscribed to than low end ones he could get, for example, for free.

It is also possible to check if the higher priority level is used by other traffic before deciding to change the priority level of one stream. In case there is a given level of traffic already in the high priority, the change of priority is not done to avoid disturbing the high priority traffic.

The criterion of choice can be any combination of the above methods, such as choosing the priority from the kind of received stream, then among these streams, choosing the priority according to the destination as imposed by the user. This is just an example and any combination of the above methods is possible.

The criterion of choice can be decided by the upper layer (such as UpnP QoS, or any kind of home network middleware). Another option is to decide that the first video being transmitted by the access point will be considered (by default) as the highest priority (considering that the new corner will be prevented to crash the network)

The mechanism used to prioritize can be extended to more than 2 videos and to other access categories as well. It can then be applicable to traffic from multiple VLAN.

It is also possible to have several networks, represented by multiple SSID ("Service Set Identifier") on the wireless network. SSID is a 32-character unique identifier attached to the header of packets sent over a WLAN ("Wireless Local Area Network") that acts as a password when a mobile device tries to connect to the network. Multi SSID support can be implemented by multiple instantiations of the MAC. Defining several SSID several VLAN ("Virtual Local Area Network") are defined on the WLAN. The several instances of the MAC compete to access the medium (arbitration being done internally in the MAC). By default, each SSID has access to the medium with the same priority. It means that no differentiation is done between traffic from different SSIDs.

Medium access differentiation per VLAN would be nice to offer better traffic quality for some VLAN considered as high priority as compared to low priority VLAN. For example at home, we may have a SSID#1 for the children and a SSID#2 for corporate usage. For best effort traffic, it would be nice to have better traffic quality for SSID#2 than for SSID#1.

The VLAN used could be the criterion to attribute priority between received streams.

The proposed method has the following main advantages, this is a method to prioritize between different videos. It allows securing transmission of some videos when bandwidth is not available for all videos. It prevents the network to crash when a second video is attempted with insufficient bandwidth and finally it permits to secure transmission of some VLAN traffic when presence of multiple VLANs in a network with insufficient bandwidth. While described in the domain of 802.11 protocols, the invention could also apply in other type of networks where a prioritization is done according to the type of distributed stream. The invention could also concern types of streams other than video.

REFERENCES (a) ISO/IEC 8802-11:1999(E) IEEE Std 802.11, 1999 edition (Reaff 2003)
(b) IEEE P802.11e/D12.0, December 2004 (Draft Amendment to IEEE Std 802.11, 1999 Edition (Reaff 2003))
(c) WiFi-WMM-test-plan-v1-1
(d) WMM specification: 11-03-0504-07-000e-WME

The invention claimed is:

1. Method of transmission of streams in a network, wherein at least two of said streams have a same stream type and access categories giving access to said network with predetermined transmission priority levels are predeterminedly attributed to each stream type and a set of medium access parameters is predeterminedly attributed to each of said access categories, the method comprising the following steps:
    determination of differentiating transmission priority levels for each of the streams of a same type according to a selection criterion for prioritization between streams of a same type;
    modification of attribution of access categories predetermined for each of said stream types so that at least one of said streams of a same type for which a lower differentiating transmission priority level is determined is down categorized in an access category giving access to the network with a lower transmission priority level than at least one of said streams of a same type being considered as more important;
    modification of the set of medium access parameters attributed to said access category giving access to the network with a lower transmission priority level, enabling distribution of said streams of a same type in said access category with said lower differentiating transmission priority level; and
    transmission of said streams according to said modified attribution of access categories predetermined for each of said stream types and according to said modified set of medium access parameters attributed to said access categories.

2. Method according to claim 1, wherein the transmitting device being a home gateway between a source and transmitting data to at least one station on the local area network.

3. Method according to claim 1, wherein the selection criteria comprises a step of verifying the transmission priority level used by other traffic.

4. Method according to claim 1, wherein the selection criterion comprises the order of reception of streams for a certain stream type and where a first received stream receives a level of priority corresponding to the type of the stream while at least one subsequent received stream of the same type as said first received stream receives a lower level of priority.

5. Method according to claim 1, wherein the selection criterion comprises the origin of the transmitted stream.

6. Method according to claim 1, wherein the selection criterion comprises the destination of the transmitted stream.

7. Method according to claim 1, wherein several virtual networks are used on the network and wherein the selection criterion comprises an identification of the virtual network used to transmit the stream.

8. Transmitting device between a source and at least one station connected to the transmitting device, wherein said at least one station is connected to said transmitting device via a network, the transmitting device having reception means receiving streams of data from the source, transmitting means to transmit received streams to at least one station connected to the transmitting device, at least two streams having a same stream type and access categories giving access to said network with predetermined transmission priority levels are predeterminedly attributed to each stream type and a set of medium access parameters is predeterminedly attributed to each of said access categories, determination means of a differentiating transmission priority level for each of the streams of a same type according to a selection criterion for prioritization between streams of a same type, modification means to modify attribution of access categories predetermined for each of said stream types so that at least one of said streams of a same type for which a lower differentiating transmission priority level is determined is down categorized in an access category giving access to the network with a lower transmission priority level than at least one of said streams of a same type being considered as more important, modification means to modify the set of medium access parameters attributed to said access category enabling distribution of said streams of a same type in said access category giving access to the network with said lower differentiating transmission priority level, and where said transmitting means are adapted to a transmission of streams according to said modified attribution of access categories predetermined for each of said stream types and according to said modified set of medium access parameters attributed to said access categories.

9. Device according to claim 8, wherein the selection criterion comprises the order of reception of streams for a certain stream type and where a first received stream receives a level of priority corresponding to the type of the stream while at least one subsequent received stream of the same type as said first received stream receives a lower level of priority.

10. Device according to claim 8, wherein the selection criterion comprises the verification of the transmission priority level used by other traffic.

11. Device according to claim 8, wherein the selection criterion comprises the origin of the transmitted stream.

12. Device according to claim 8, wherein the selection criterion comprises the destination of the transmitted stream.

13. Device according to claim 8, wherein the device further comprises means to manage several virtual networks on the wireless network and wherein the selection criterion comprises an identification of the virtual network used to transmit the stream.

14. Method according to claim 1 wherein, a tag in the stream being associated with each level of transmission priority, the step of determination of a priority level for streams of a same type comprises changing the tag in the stream for at least one stream of a same type.

15. Method according to claim 1 wherein the stream type is video.

16. Method according to claim 1, wherein the step of determination of a transmission priority level for streams of a same type according to a selection criterion comprises the following steps:
    creation of at least two queues prior to a transmit queue per stream of a same type;
    prioritization of said at least two queues according to a determined algorithm; and
    output of the at least two queues as at least two streams as input streams to said step of transmission of streams.

* * * * *